United States Patent

[11] 3,614,332

[72] Inventor Motohiro Nagasaki
 101 Tokiwomatsu-cho, Shibuya-ku, Tokyo, Japan
[21] Appl. No. 843,106
[22] Filed Sept. 29, 1959
[45] Patented Oct. 19, 1971
[32] Priority Oct. 3, 1958
[33] Japan
[31] 33/28195

[54] ELECTROMAGNETIC STEREOPHONIC PHONOGRAPH PICKUP
 10 Claims, 10 Drawing Figs.
[52] U.S. Cl. .................................................. 179/100.41K
[51] Int. Cl. ........................................................ H04r 11/12
[50] Field of Search ............................................ 179/100.41
 ST, 100.41 Z, 100.41 PE, 100.41 S

[56] References Cited
UNITED STATES PATENTS

| | | | |
|---|---|---|---|
| 2,507,708 | 5/1950 | Greener | 179/100.11 |
| 2,875,282 | 2/1959 | Reiback | 179/100.41 |
| 2,879,413 | 3/1959 | Smith-Johannsen | 179/100.41 |
| 3,040,136 | 6/1962 | Grado | 179/100.41 |
| 3,055,988 | 9/1962 | Bauer | 179/100.41 |
| 3,077,521 | 2/1963 | Aherns | 179/100.41 |
| 3,077,522 | 2/1963 | Gunter | 179/100.41 |

FOREIGN PATENTS

| 336,648 | 10/1930 | Great Britain | 179/100.41 |
|---|---|---|---|

OTHER REFERENCES

Philips Tech. Rev., Vol. 18, 1956/57, No. 4/5 10/20/56 pp. 101– 109.

*Primary Examiner*—Bernard Konick
*Assistant Examiner*—Raymond F. Cardillo, Jr.
*Attorneys*—James E. Armstrong and Ronald S. Cornell ABSTRACT: In an electromagnetic pickup,
 a. a freely movable spherical magnet,
  1. magnetized on a dimeter and
  2. having a stylus arm attached thereto at an acute angle to said diameter,
 b. means mounting the sphere for a swiveling movement about the center thereof to form a vibrating system arranged so that the center of the moment of inertia of the vibrating system corresponds with the center of movement of the stylus and,
 c. a plurality of stator elements each having a pair of pole pieces facing said spherical magnet and on opposite sides of a plane normal to the poles of said spherical magnet,
  1. the respective poles of one stator being in a vertical plane substantially 90° around the spherical magnet poles from the corresponding poles of a second stator element, and
  2. the stator elements being symmetrically arranged around the spherical magnet so that the magnetic airgap between said stator elements and said spherical magnet remains substantially constant.

PATENTED OCT 19 1971
3,614,332
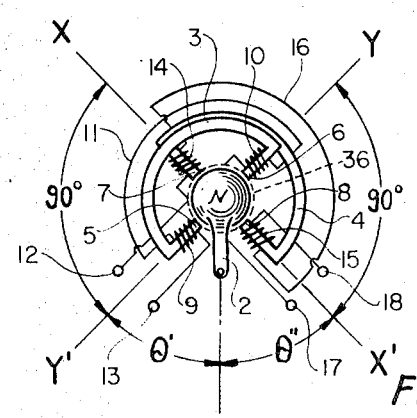
FIG. 1.
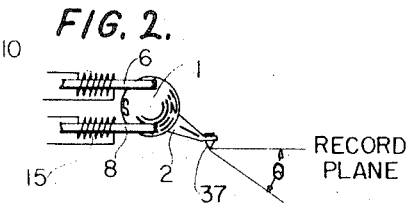
FIG. 2.
RECORD PLANE
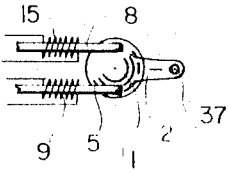
FIG. 3.
FIG. 4.
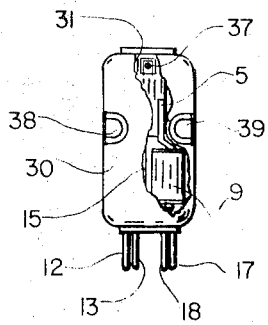
FIG. 5.
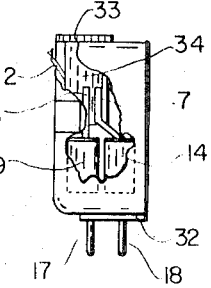
FIG. 6.
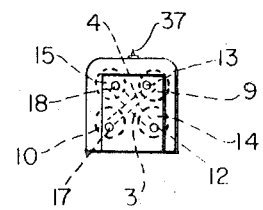
FIG. 7.
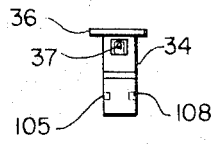
FIG. 8.
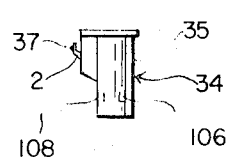
FIG. 9.
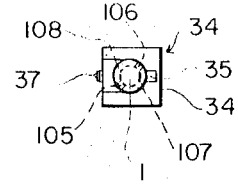
FIG. 10.
INVENTOR.
Motohiro Nagasaki
BY
Chandlee Pidgeon
AGENT

ELECTROMAGNETIC STEREOPHONIC PHONOGRAPH PICKUP

This invention relates to an Electromagnetic Pickup, and more particularly to a pickup having a moving magnet which generates and E.M.F. in a set of stator coils.

In this invention, a freely movable magnet element, having a stylus attached thereto, vibrates in the field of a plurality of stator elements having coils applied thereto; and whereby E.M.F's are generated in the coils.

An object of this invention is the provision of a pickup including a moving magnet having several degrees of freedom of movement.

A further object of this invention is the provision of a pickup having a single stylus which can respond to more than one sound track in a single groove.

Another object of this invention is the provision of a pickup which can reproduce single groove 45/45-type stereophonic recordings as well as single groove monophonic recordings.

A still further object of this invention is the provision of a pickup wherein the center of movement of the stylus approximately coincides with the center of the moment of inertia of the vibrating system.

These and other objects will be apparent from a consideration of the following specification taken with the accompanying drawing forming a part thereof.

In the drawings:

FIG. 1 is a schematic bottom view of my pickup showing the relation of the coils of the stator elements to the stylus magnet;

FIG. 2 is a fragmentary side view showing the movable stylus carrying magnet and a pair of pole pieces with their coils;

FIG. 3 is a fragmentary bottom view of the elements shown in FIG. 2;

FIG. 4 is an axonometric view of the stylus and its magnet;

FIG. 5 is a bottom view of a pickup with parts broken away;

FIG. 6 is a side view of same;

FIG. 7 is a view from the terminal end showing the arrangement of the coils;

FIG. 8 is a bottom view of the replaceable stylus assembly;

FIG. 9 is a side view of same, and

FIG. 10 is an end view of same.

Heretofore moving magnets have been used in phonograph pickups for the reproduction of single groove stereophonic and monophonic recordings. Such magnets have been in the form of rods or bars and resulted in large moving masses with intricate suspension systems. Such arrangements are not ideally suited to this use when the dynamics of the system are considered.

An object of this invention is, therefore to provide a reduction in the mass of the movable elements to a minimum and also to provide sufficient electrical output for practical needs. This is accomplished in my invention by making the center of the moment of inertia of the vibrating system correspond with the center of movement of the suspension system.

Referring now to the drawings wherein like parts are represented by like characters of reference, I show in FIG. 1 a diagrammatic and schematic representation of my pickup system. Numeral 1 represents a spherical magnet having a stylus arm 2 attached thereto. The stylus arm 2 is mounted so as to be an an angle $\theta$ with the plane of the record groove as seen in FIG. 20. The sphere 1 is magnetized in a direction normal to plane of the drawing and the N pole faces the viewer in FIG. 1. Adjacent the spherical magnet 1 there is a pair of stator elements 3 and 4, substantially of horseshoe shape and each having a pair of pole pieces such as poles 5 and 6 for the element 3 and poles 7 and 8 for the element 4. These stator elements are formed of high permeability material. The poles 7 and 8 are arranged on the axis X—X' and the poles 5 and 6 are arranged on the axis Y—Y' at right angles to the axis X—X'. The stylus is so positioned that the angles $\theta'$ and $\theta''$ are equal, and are in this case approximately 45° with relation to the axes X—X' and Y—Y' as seen in FIG. 1.

About the poles 5 and 6 are wound a pair of coils, respectively, 9 and 10 reversely wound and connected in series by the conductor 11, with the other terminals connected to the terminal pins 12, 13. Also about the poles 7 and 8 are wound similar coils 14 and 15 respectively, reversely wound and connected in series by the conductor 16 and having their other terminals connected to the pins 17, 18. The pole pieces 5 and 8 are in a plane lower, as seen in FIG. 2, than the plane in which pole pieces 6 and 9 are located. In operation the magnet is rotated or oscillated about its center by movement of the stylus 37 in a record groove. This movement changes the position of the magnet poles relative to the pole pieces 5, 6 and 7, 8, thereby generating E.M.F's. in the coils 9, 10, 14 and 15 which E.M.F's are fed into a suitable amplifier.

The above description covers the electromagnetic features of my invention. I shall now provide details of construction. In FIGS. 5, 6 and 7 I show certain details including a suitable casing 30. The casing 30 is preferably cylindrical and has an opening 31 in one end of the cylindrical wall to accommodate the stylus arm 2. Within the casing 30 the stators are arranged with the coils 9, 10, 14 and 15 adjacent one end and the pole pieces extending toward the other end as best shown in FIGS. 5 and 6. The rear end of the casing is closed by a plate or plug 32 of insulating material through which the connector pins 12, 13, 17 and 18 project. An opening 33 in the other end of the casing 30 accommodates the stylus cartridge 34. In the sides of the cartridge 34, I mount auxiliary pole tips 105, 106, 107 and 108 adapted to register respectively with the poles 5, 6, 7 and 8 when the cartridge is in position.

Within the cartridge 34, in a substantially spherical socket, I mount the spherical magnet 1 and preferably surround same with a thin layer of damping material, such as a thin sheet of elastomeric material or a film of oil. I prefer a very thin layer of damping material to make the magnetic airgap as small as possible. A key 35 is provided on the cartridge 34 and is adapted to engage a suitable guide in the casing 30 to insure proper registry upon inserting same in the casing 30. The cartridge 34 is provided with a small flange 36 to engage over the opening 33.

Another method of supporting and damping the movable magnet 1 may be by the use of short rods A,A', B,B' as shown in FIG. 4. These rods may be made of suitable elastomeric material, such as nylon, Teflon, etc. They are mounted on diameters which cross at right angles.

The spherical cup or socket mentioned above is shown in dotted lines in FIG. 1 at 36. This cup may be of suitable elastomeric materials as mentioned above or may be a layer of silicone grease, and may be used with or without the rods A,A', B,B'. The spherical magnet may be formed of ferric oxide powder or other suitable magnetizable material. The stylus arm 2 may be tipped with a suitable jewel or needle 37, 38 and 39 are holes for mounting screws.

In operation, assume that the record groove has a signal track on only the left side. Then the spherical magnet will rotate or oscillate on the X—X' axis. Oscillation of the spherical magnet about its axis in any direction will change the relation of the axis or poles thereof to the pole pieces 5, 6, 7 and 8 and an E.M.F. will be generated in the coils 9 and 10. If the stylus moves in an undulating vertical path only, an E.M.F. will occur in both sets of coils, 9-10 and 14-15, of equal frequency but of opposite phase. Thus reproductions of stereophonic 45/45 system records can be made.

It is to be understood that though I have described a preferred form of my invention, various modifications may be attained within the skill of the art and the scope of the appended claims.

I claim:

1. In an electromagnetic pickup,
   a. a freely movable spherical magnet,
      1. magnetized on a diameter and
      2. having a stylus arm attached thereto at an acute angle to said diameter,
   b. means mounting the sphere for a swiveling movement about the center thereof to form a vibrating system arranged so that the center of the moment of inertia of the vibrating system corresponds with the center of movement of the stylus and, c. a plurality of stator elements each having a pair of pole pieces facing said spherical magnet and on opposite sides of a plane normal to the poles of said spherical magnet,
1. the respective poles of one stator being in a vertical plane substantially 90° around the spherical magnet poles from the corresponding poles of a second stator element, and
2. the stator elements being symmetrically arranged around the spherical magnet so that the magnetic airgap between said stator elements and said spherical magnet remains substantially constant.

2. The structure according to claim 1, wherein the stator elements are of horseshoe shape and wherein the poles of each are in a single vertical plane, but are staggered relative to a plane normal to said vertical plane and through the axis of the spherical magnet.

3. A pickup for single groove stereo reproduction including a cartridge, a freely movable spherical magnet in said cartridge, said magnet being magnetized on a diameter, a stylus arm mounted on said magnet at an acute angle to the axis of magnetization, means mounting the sphere for swiveling movement about the center thereof to form a vibrating system arranged so that the center of the moment of inertia of the vibrating system corresponds with the center of movement of the stylus, a plurality of horseshoe-type stator elements having pole pieces adjacent said spherical magnet, the pole pieces of each stator element being on opposite sides of a central plane through the axis of magnetization, one pole piece of each stator element being in the same plane as one pole piece of the other stator element, a coil on each stator element, and terminal pins for each coil projecting through said cartridge.

4. The structure as defined in claim 3, wherein each coil comprises two oppositely wound series connected sections one section being on each leg of the associated horseshoe-type stator element.

5. The structure as defined in claim 3, wherein the spherical magnet is magnetized on an axis substantially normal to the planes of said pole pieces.

6. The structure as defined in claim 3, wherein the cartridge includes a plurality of pole inserts in register with the first-mentioned poles.

7. The structure as defined in claim 6 including damping material between the spherical magnet and the pole inserts.

8. The structure as defined in claim 7, wherein the damping material comprises a plurality of short rods of elastomeric material.

9. The structure as defined in claim 7, wherein the damping material comprises a layer of elastomeric material.

10. The structure as defined in claim 7, wherein the damping material comprises a layer of silicone grease.